No. 707,498. Patented Aug. 19, 1902.
J. E. BICKFORD.
PEGGING MACHINE.
(Application filed Mar. 16, 1901.)
(No Model.) 2 Sheets—Sheet 1.

WITNESSES. INVENTOR.
Frank G. Parker John E. Bickford
John Buckler

UNITED STATES PATENT OFFICE.

JOHN E. BICKFORD, OF WHITMAN, MASSACHUSETTS.

PEGGING-MACHINE.

SPECIFICATION forming part of Letters Patent No. 707,498, dated August 19, 1902.

Application filed March 16, 1901. Serial No. 51,552. (No model.)

*To all whom it may concern:*

Be it known that I, JOHN E. BICKFORD, of Whitman, in the county of Plymouth and State of Massachusetts, have invented a new and useful Improvement in Pegging-Machines, of which the following, taken in connection with the accompanying drawings, is a specification.

My invention relates to a peculiar arrangement of parts and to the construction of the same in a pegging-machine; and it consists in an adjustable feed mechanism and in minor mechanical details, which may be best understood by reference to the full description.

The object is to simplify the general construction and to make an improved adjustable feed. These objects I attain by the mechanism shown in the accompanying drawings, in which—

Figures 1, 3, 4, 5, 6:
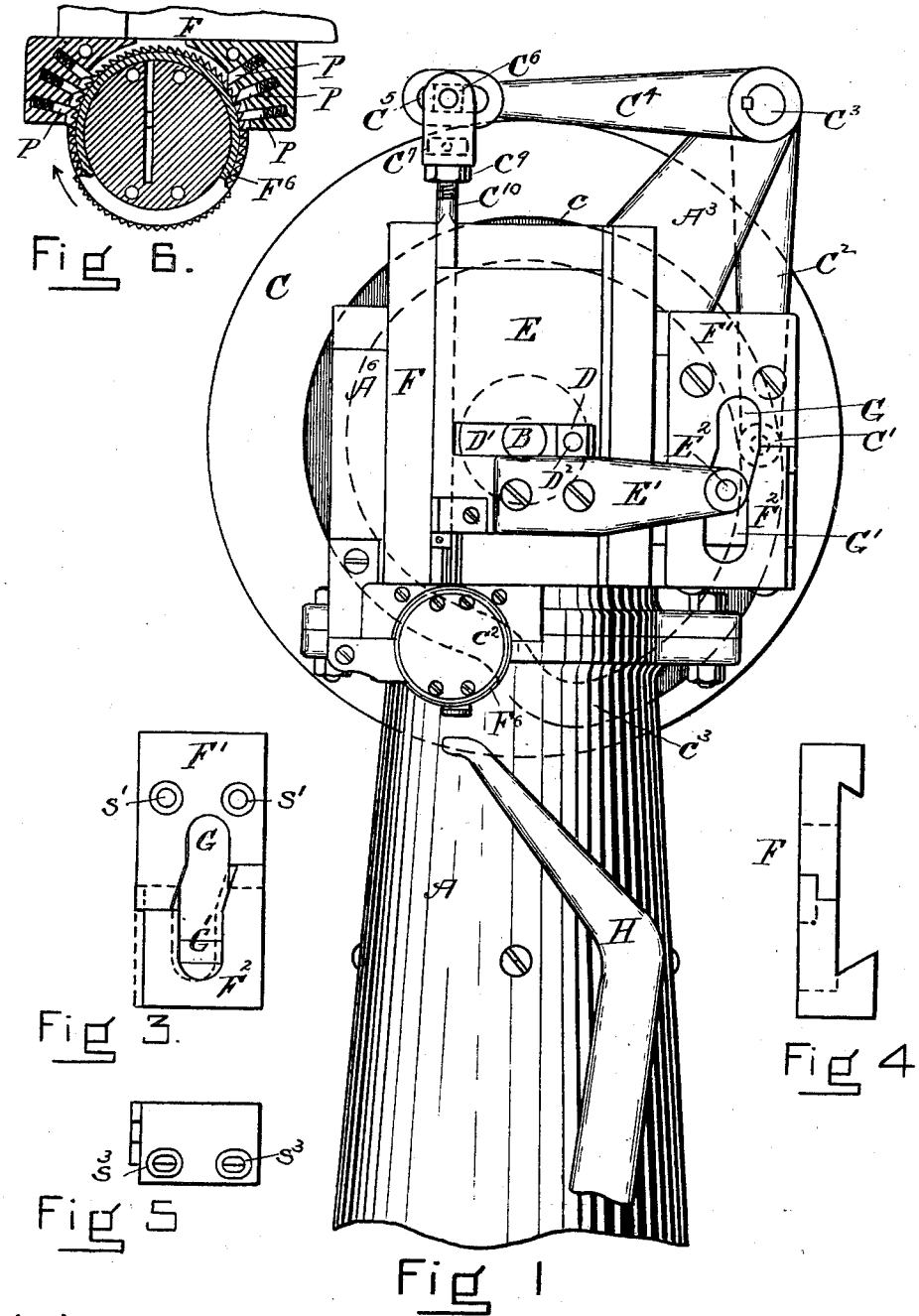
Figure 2:
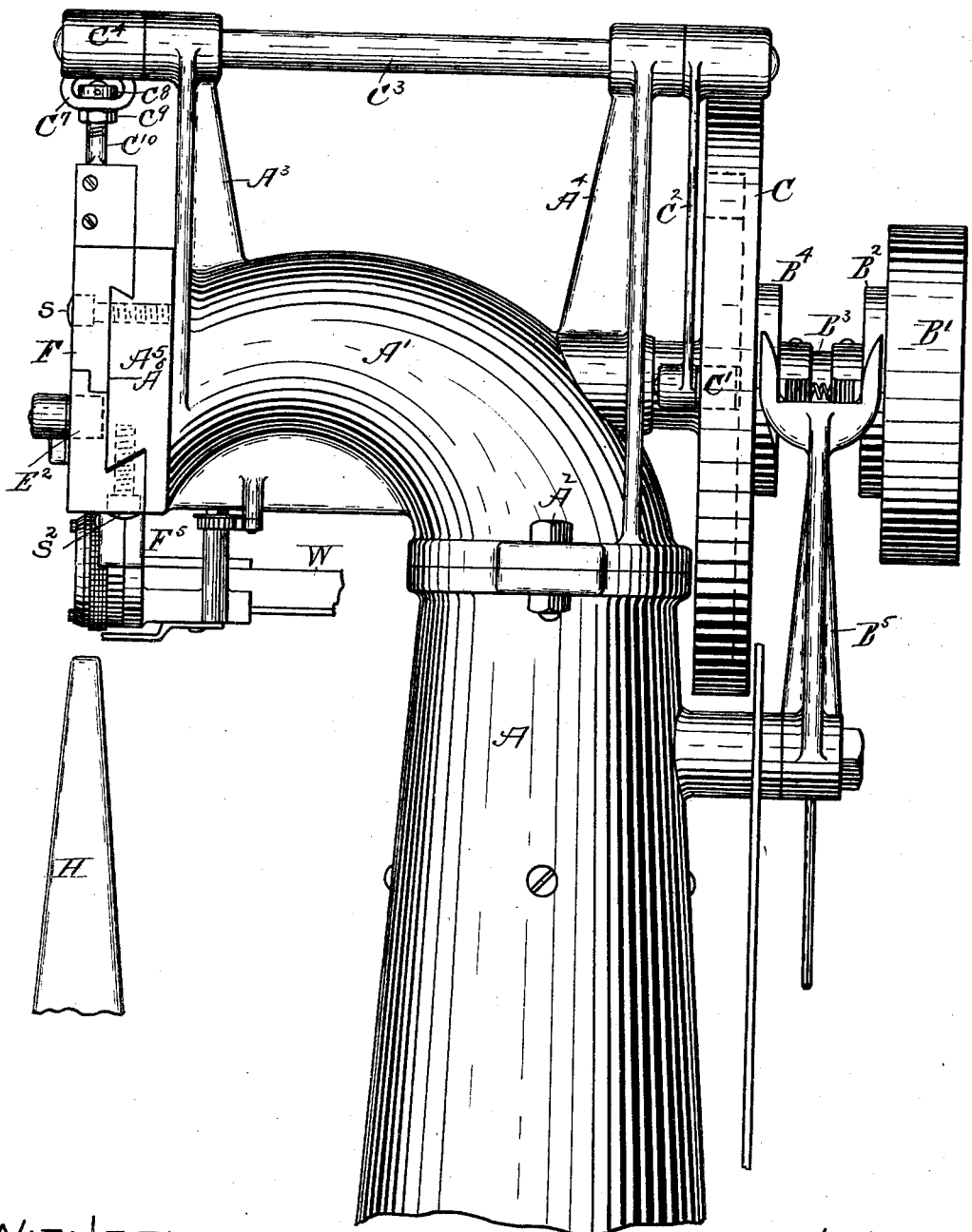

Figure 1 shows in elevation all of my machine except the lower part of the horn and the supporting-post. Fig. 2 is a side elevation of the same. Figs. 3, 4, and 5 illustrate in detail an adjustable gage or cam-block for governing the motion of the feed-plate. Fig. 6 is a vertical section showing the ring-feed and its connected parts.

In the drawings the supporting-post of the machine is indicated by A, and the horn by H. The head and head-plate of the machine are indicated by $A'$ $A^5$. The head is attached to the supporting-post by screw-bolts $A^2$. The main shaft of the machine is not shown on the drawings except that its end is shown at B, Fig. 1. This main shaft is journaled in a suitable bearing in the head of the machine. The shaft is driven by the loose pulley $B'$, which has a clutch connection $B^2$ $B^3$ with the main shaft. The large cam-wheel C is also normally loose on the main shaft, but may be connected with it and the driving pulley by the clutch device $B^3$ $B^4$. The entire clutch device, including the lever $B^5$ and its connection, is known as the "Varney" clutch and need not be more fully described, as it is well known and in common use.

The feed-plate F is connected to the head-plate $A^5$ by a dovetail slide, (indicated at $A^6$, Fig. 2,) so as to have a limited lateral motion—that is, a feeding motion—sufficient to cause the awl and driver to move laterally back and forth a distance equal to the desired peg-space, as will be explained. The feed-plate F has attached to it an awl-carrying plate E, which slides vertically in said feed-plate and is operated by a crank-block D, Fig. 1, attached to a crank-pin $D^2$ on the disk $D'$, which in turn is connected to the main shaft B. The lateral or feed motion is given to both the awl and feed-plates by a device which I will now describe.

An arm $E'$ is attached to the awl-plate E by screws or other suitable means and has a roller $E^2$ extending back from it. (See dotted lines in Fig. 2.) This roller engages with a cam-slot G G', made in the cam-slot block $F'$ $F^2$. The cam-slot block is made in two parts, as shown in Figs. 3 and 4. The upper part $F'$ is rigidly attached to the head-plate $A^5$ of the machine by screws S, one of which is shown in Fig. 2, the screws passing through the holes $S'$ $S'$ in the part $F'$, (see Fig. 3;) but the lower part $F^2$ of the cam-slot block is adjustably attached to the said head-plate by means of screws $S^2$, one of which is shown in Fig. 2. These screws pass through elongated holes $S^3$ $S^3$, made in said part, (see Fig. 5,) so that the lower part $F^2$ of said cam-block can be adjusted laterally in relation to the upper part $F'$. Looking at Fig. 1 it may be readily understood that as the awl-plate E moves up and down the cam-roller $E^2$ on the arm E will work in the slot G G', and as that slot is not a straight vertical slot it is evident that the said awl-plate E must have a lateral motion, and as the said plate E has no lateral motion in the feed-plate F the said feed-plate F must also have a lateral motion, the extent of which will be governed by the slot G G'. To regulate this feed motion, the lower part $F^2$ of the cam-slot block may be adjusted laterally by slacking the screws $S^2$, moving the part to the desired position, and then tightening the said screws.

Motion is given to the drive-bar $C^{10}$ by the following-described device: The drive-bar $C^{10}$ is adjustably attached by screw-nuts $C^9$ $C^8$ to the yoke-piece $C^7$, which is connected to the arm $C^4$ of the rocker-shaft $C^3$ by means of a block $C^6$ in the slot $C^5$. (See Fig. 1.) Motion is given to the rocker-shaft $C^3$ by means of an arm $C^2$, which has a cam-roller $C'$ at its lower end, which engages with a cam-groove $c$ $c$ $c$ $c$ in the cam C. The cam-groove is arranged to cause the driver-bar $C^{10}$ to ascend during the passage of the groove (in contact with cam-roller $C'$) from $c^3$ to $c$, then to remain up and without motion from $c$ to $c^2$, and to descend with great velocity during the cam-groove passage from $c^2$ to $c^3$. The rocker-shaft $C^3$ is journaled on the standards $A^3 A^4$.

The feed device used in this machine is of the kind known as the "ring-feed," and consists of a ring $F^6$, Fig. 1, (shown in detail in Fig. 6,) which is held securely to the feed-plate F and is free to rotate in the direction of the arrow, Fig. 6, but is held from rotation in the other direction by spring-pawls P P. These pawls P P are set differentially in relation to the teeth of the ratchet on the feed-ring. So if one of the pawls does not engage with the ratchet some other one will. Thus the feed-wheel will be held in any position that it may stop in. The action of the ring-feed may be explained as follows: We will suppose that the sole of the shoe is pressed against the under surface of the feed-ring (in which case the feed-ring becomes or acts like a feed-foot) and that the feed-plate F and feed-ring occupy the right-hand position. Now as the machine works the feed-plate will be forced to the left. This action will cause the feed-ring to move to the left, and (as the feed-ring cannot turn, being held by one of the pawls P P) thus move the shoe one peg-space to the left, the shoe sliding on the horn H. As the feed-plate moves back to its original position the ring-feed is free to roll on the sole of the shoe, so as to assume its right-hand position, ready for the next feed movement.

The peg-wood box and its feeding and cutting-off mechanism are attached to the feed-plate F by the arm $F^5$, Fig. 2. The peg-strip is shown at W. These parts need not be described, as they are old and well known in the art.

In the above description I have included the peg-driving mechanism, but do not claim any part of the peg-driving mechanism in this application, as that will be the subject-matter of a division of this case.

I claim—

In a pegging-machine; a peg-driver, a feed-plate mounted for lateral movement in the machine-head, feed devices carried by said feed-plate, an awl-plate mounted for vertical movement in said feed-plate, an awl carried by said awl-plate, means to vertically reciprocate said awl-plate, a laterally-projecting arm on said awl-plate, a cam-roll carried by said arm, a plate attached to the machine-head and provided with an adjustable cam-groove, whereby, as said pawl-plate is vertically reciprocated, it and the feed-plate will be given a simultaneous lateral movement to feed the work, the extent of said feed movement being dependent upon the adjustment of the cam-groove, substantially as and for the purpose set forth.

In testimony whereof I have signed my name to this specification, in the presence of two subscribing witnesses, on this 15th day of March, A. D. 1901.

JOHN E. BICKFORD.

Witnesses:
FRANK G. PARKER,
JOHN BUCKLER.

It is hereby certified that in Letters Patent No. 707,498, granted August 19, 1902, upon the application of John E. Bickford, of Whitman, Massachusetts, for an improvement in "Pegging-Machines," an error appears in the printed specification requiring correction, as follows: In line 60, page 2, the word "pawl-plate" should read *aul-plate;* and that the said Letters Patent should be read with this correction therein that the same may conform to the record of the case in the Patent Office.

Signed and sealed this 9th day of December, A. D., 1902.

[SEAL.]

F. I. ALLEN,
*Commissioner of Patents.*